(12) United States Patent
Voto et al.

(10) Patent No.: US 6,879,111 B2
(45) Date of Patent: Apr. 12, 2005

(54) DC/AC AND DC/DC POWER SUPPLY FOR LCD DISPLAYS

(75) Inventors: Andrew Michael Voto, Brighton, MI (US); Robert Martin Voto, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 285 days.

(21) Appl. No.: 10/157,648

(22) Filed: May 29, 2002

(65) Prior Publication Data

US 2003/0222631 A1 Dec. 4, 2003

(51) Int. Cl.[7] ................................................ G09G 3/10
(52) U.S. Cl. ............................ 315/169.3; 315/209 R; 315/291
(58) Field of Search ......................... 315/169.1, 169.3, 315/169.4, 224, 291, 209 R, 307, DIG. 5; 363/97, 56, 131–132, 20

(56) References Cited

U.S. PATENT DOCUMENTS

| | | | | |
|---|---|---|---|---|
| 4,608,958 A | * | 9/1986 | Sakakibara et al. ......... | 123/605 |
| 5,450,221 A | | 9/1995 | Owen et al. .................. | 349/58 |
| 5,548,189 A | * | 8/1996 | Williams ..................... | 315/224 |
| 5,619,402 A | * | 4/1997 | Liu .............................. | 363/20 |
| 5,709,576 A | | 1/1998 | Lippmann et al. ............. | 445/3 |
| 5,936,603 A | | 8/1999 | Lippmann et al. .......... | 345/101 |
| 6,118,219 A | * | 9/2000 | Okigami et al. ......... | 315/169.3 |
| 2003/0160574 A1 | * | 8/2003 | Gray .......................... | 315/291 |

* cited by examiner

*Primary Examiner*—Don Wong
*Assistant Examiner*—Jimmy Vu
(74) *Attorney, Agent, or Firm*—Stefan V. Chmielewski

(57) ABSTRACT

A voltage power supply circuit is provided that uses the voltage output of an oscillator to provide a high voltage DC output to drive a liquid crystal display device. A controller IC opens and closes an FET to allow the EMF of an inductor to generate a DC voltage that exceeds the battery voltage source for the liquid crystal display device. Accordingly, the oscillator circuit that drives a back light display for a liquid crystal device is simultaneously used to generate the high voltage DC source for the liquid crystal display device.

20 Claims, 2 Drawing Sheets

DC/AC AND DC/DC POWER SUPPLY FOR LCD DISPLAYS

TECHNICAL FIELD

The present invention generally relates to a high voltage DC and AC output source, and more particularly, the present invention relates to a high voltage DC and AC output source that uses an oscillator circuit to generate high DC and AC voltages.

BACKGROUND OF THE INVENTION

Conventionally, Liquid Crystal Displays (LCDs) require many different voltages to drive various components within the display, including the LCD glass itself. DC voltages are needed to drive various DC elements while an AC source is needed to drive AC elements within the LCD device.

To meet the LCD's DC voltage need, multiple and different voltages must be supplied to various components within the LCD device. Multi-tap transformers are sometimes used to generate these varying DC voltages. Linear regulators can be also employed to step down the source voltage to the different voltages. However, in battery driven LCD devices, at least one required DC voltage often exceeds the battery voltage. As this voltage requirement is outside the range of the input battery, a switching power supply is also required in addition to the aforementioned linear regulators.

An AC voltage source typically drives cold cathode fluorescent lamps (CCFL). These lamps backlight the LCD display and also require a large AC voltage from the AC voltage source for operation. To meet this need, the AC voltage source is also often times larger than the input battery source. Accordingly, to generate the high AC output, many LCD system manufacturers employ oscillator circuits to generate the high AC voltage.

Although the above described design addresses the requisite DC and AC voltage needs for a battery driven LCD display, drawbacks exist. Specifically, with the conventional system, numerous components must be incorporated into the system to provide the needed multitude of diverse voltage sources. These additional components drive up the cost of the overall LCD system. Additionally, as LCD display systems are commonly used in size-limited microcomponents, the additional elements inhibit the microdevice's goal of size reduction. The present invention is developed in light of these and other drawbacks.

SUMMARY OF THE INVENTION

To address these and other drawbacks, the present invention utilizes the output of an oscillator circuit to generate both the high DC and AC voltages for the LCD device. Accordingly, the present invention is able to drive both the back light display and glass for an LCD system with minimal components.

In one aspect of the present invention, an oscillator circuit connects to ground through an inductor and a switch in series. A DC voltage circuit is electrically connected to the oscillator circuit. When the switch does not conduct, the EMF from the inductor generates a high voltage that exceeds the voltage of the battery sourcing the oscillator circuit. This high voltage is directed to the DC voltage circuit, which, in turn, drives a DC output device.

In another aspect of the present invention, the oscillator circuit includes a Royer oscillator circuit that drives an AC voltage circuit. The AC voltage circuit, in turn, drives a cold cathode fluorescent lamp for back lighting a liquid crystal display system.

In another aspect of the present invention, a DC output from the Royer oscillator passes through an inductor and a FET. The FET is controlled by a controller IC which turns the FET on and off at a predetermined frequency. A DC voltage circuit is attached to the DC voltage output from the oscillator circuit at a position on a high potential side of the FET. A clamping circuit connects between the DC voltage circuit and a battery voltage source, to clamp the DC circuit to a level above the battery voltage source. The DC voltage circuit, in turn, drives the LCD glass of the LCD.

Other objects and features of the present invention will become more readily apparent from a better understanding of the preferred embodiments described below with reference to the following drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
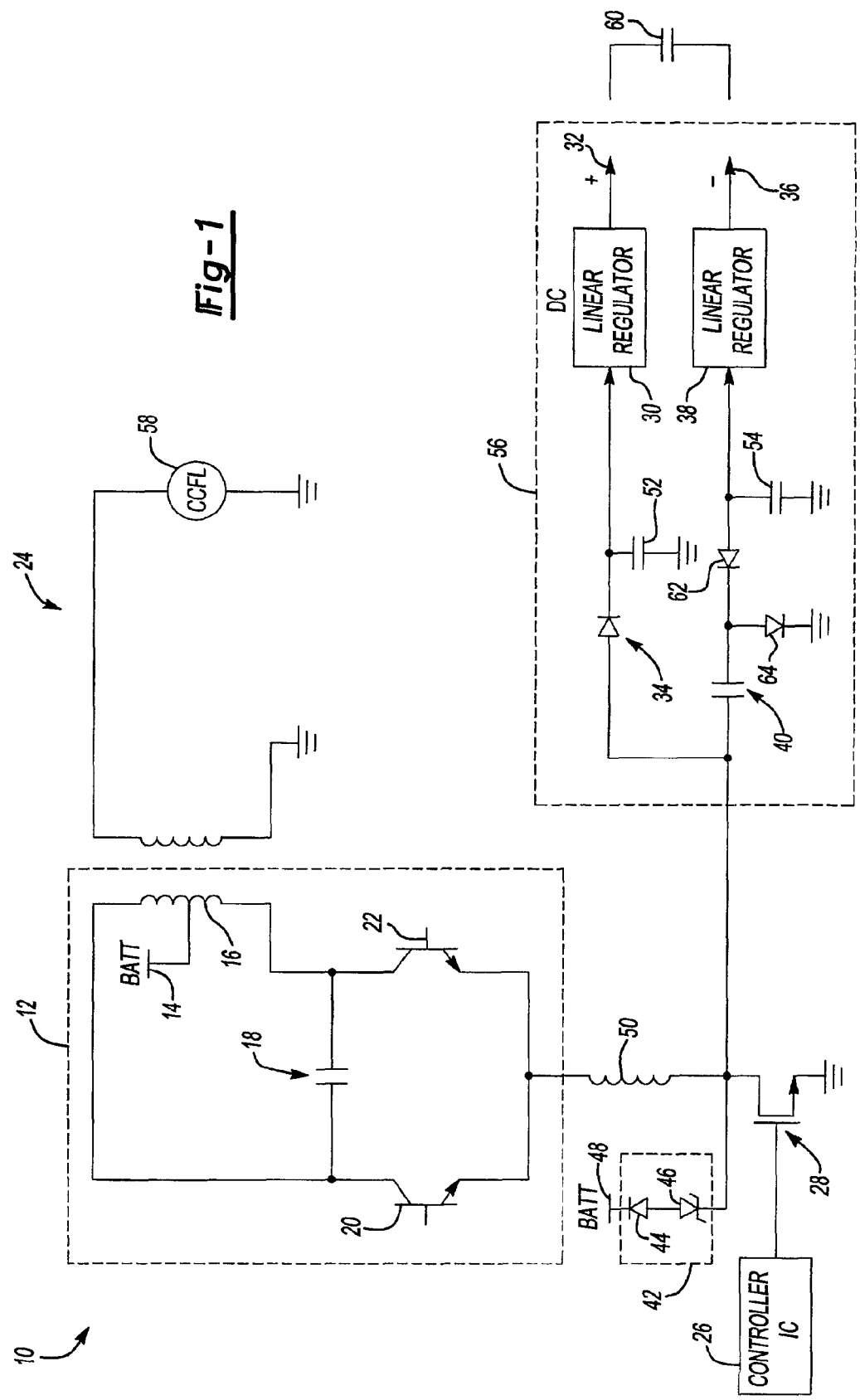
FIG. 1 is a schematic diagram of a voltage power supply circuit according to the present invention.

Referring now to FIG. 1, a voltage power supply circuit 10 is shown and described. A Royer oscillator circuit 12 is shown including a battery source 14, inductor 16 and capacitor 18. Royer oscillator 12 provides the desired AC frequency to a high voltage AC output circuit 24. Transistors 20 and 22 are fed base voltages at the frequency of the Royer oscillator circuit 12 to control feed back and oscillate the current flow through the circuit at the desired frequency. Although the present embodiment utilizes a Royer type oscillating circuit, other types of oscillating circuits can be used and the present invention is not limited to the Royer oscillator circuit disclosed herein.

Inductor 50 and FET 28 are positioned in series between a ground and oscillator circuit 12. Accordingly, current can pass from Royer oscillator circuit 12, through the inductor 50 and to ground when FET 28 conducts. Likewise, current is prohibited from flowing to ground through FET 28 when not conducting.

Controller IC 26 is a control circuit that drives the gate of FET 28. Based on Controller IC 26, the gate of FET is opened and closed at a predetermined frequency to generate a large EMF as will be described in greater detail. When Controller IC 26 supplies FET 28 with a control voltage causing the FET to conduct, current can flow from inductor 50 and oscillator circuit 12 through FET 28 to ground. Likewise, when the control voltage is not supplied, the FET 28 can no longer conduct.

DC output circuit 56 connects to the high potential side of FET 28 and contains a number of components to channel EMF fly back, generated when FET 28 does not conduct, to supply a high voltage DC output. On a high voltage side, DC output circuit 56 includes a linear regulator 30, high side DC output 32, and a diode 34. The linear regulator 30 and high side DC output 32 are connected to the high potential side of FET 28 through diode 34. Diode 34 is biased to allow current flow from the high potential side of FET 28 to high side DC output 32. The linear regulator 30 ensures that the resulting high side DC output maintains a desired level to drive a DC output device such as an LCD glass.

The high voltage side of DC output circuit 56 also includes a capacitor 52 that connects between the input to linear regulator 30 and ground. Capacitor 52 stores voltage generated by the fly-back EMF from inductor 50. Diode 34 is positioned between the high potential side of FET 28 and the capacitor 52 to prohibit current flow from capacitor 52 back through FET 28 when FET 28 is conducting. Accordingly, diode 34 and capacitor 52 rectifies the oscillating voltage caused by opening and closing of FET 28

A low side of the DC output circuit 56 includes a low side DC output 36, a linear regulator 38, capacitor 54, capacitor 40 and diodes 62 and 64. Linear regulator 38 ensures the low side DC output is set to the desired level. Capacitor 40 connects between the high side of FET 28 and the input to the linear regulator to invert low voltage provided from fly-back EMF generated by the inductor 50 when FET 28 does not conduct. The inverted voltage falls below ground voltage potential due to the inversion by capacitor 40. This inverted voltage is stored in capacitor 54. Capacitor 54 biases low side DC output 36 with the stored inverted voltage.

Diode 62 ensures that current flows only from low side DC output 36 and capacitor 54 to capacitor 40. Diode 64 allows current flow from capacitor 54 to ground to ensure that the potential of capacitor 54 and output 36 remains, at maximum, ground potential. Accordingly, the combination of diodes and capacitors acts to rectify and invert the fly-back EMF to a voltage that falls below ground potential.

Clamping circuit 42 is positioned between the high potential side of FET 28 and the battery 48. Clamping circuit 42 generally comprises diode 44 and zener diode 46. Zener diode 46 has a threshold voltage level that slightly exceeds the voltage level of battery 48. Diode 44 biases current flow in an opposite direction from zener diode 46 to not allow current flow from battery 48. Clamping circuit 42 clamp voltages generated at the high side of FET 28 to a value slightly above battery 48. It should be noted that battery 14 and battery 48 are preferably the same battery source. Also, other types of clamping circuits can be used in place of the clamping circuit described herein. For example, a transistor based clamping circuit could also be used and made independent of the battery. Other types of clamping circuits can also be used, and the invention is not limited to that disclosed herein.

CCFL (cold cathode fluorescent lamp) 58 is preferably a backlight display for the LCD device and is driven by AC output circuit 24. LCD glass 60 provides charge to the liquid crystals of the LCD device to indicate alphanumeric or other known LCD outputs. The high output DC voltage provided by high side DC output 32 and low side DC output 36 drives LCD glass 60.

With continued reference to FIG. 1, the operation of the voltage power supply circuit 10 is now described. Royer oscillator 12 generates a high voltage AC output to drive AC output circuit 24. Ac output circuit 24, in turn, drives an AC device such as the CCFL of the LCD device.

Current provided from Royer oscillator 12 also passes through inductor 50, FET 28 and to ground when controller IC 26 supplies a control voltage causing FET 28 to conduct. This sets up an inductive field around inductor 50. When controller IC 26 switches FET 28 to not conduct, the inductive field of inductor 50 induces continued current flow through the inductor 50 despite the fact that FET 28 no longer conducts. This creates a fly back EMF from the inductor 50 that charges both capacitors 40 and 52 with a high voltage exceeding the battery voltage. Clamping circuit 42 clamp this voltage to a voltage slightly higher than that provided by the battery, ensuring that the voltage does not become too high. The opposite side of capacitor 40 provides a low inverted voltage that charges capacitor 54 while capacitor 52 stores the direct EMF voltage.

When controller IC 26 provides the requisite voltage to the gate of FET 28 to conduct, current again flows through inductor 50 to recharge the inductive field therein. Capacitor 52, having the stored EMF fly-back voltage, applies this voltage to the linear regulator 30 and the high side DC output 32.

The low voltage from capacitor 54 is likewise applied to linear regulator 38 that, in turn, applies the requisite low voltage to low side DC output 36. Diodes 62 and 64 ensure that this voltage has a maximum at the ground potential.

Accordingly, as the high side DC output 32 exceeds the battery voltage and the low side DC voltage falls below ground level, a large DC voltage differential can be applied to an LCD device. In FIG. 1, a LCD glass 60 is shown being driven by the large DC voltage source. However, it is understood that this voltage can also drive additional LCD elements requiring a high voltage DC output. Additionally, this voltage can be stepped down to provide other required DC voltages within the LCD device.

Figure 2:
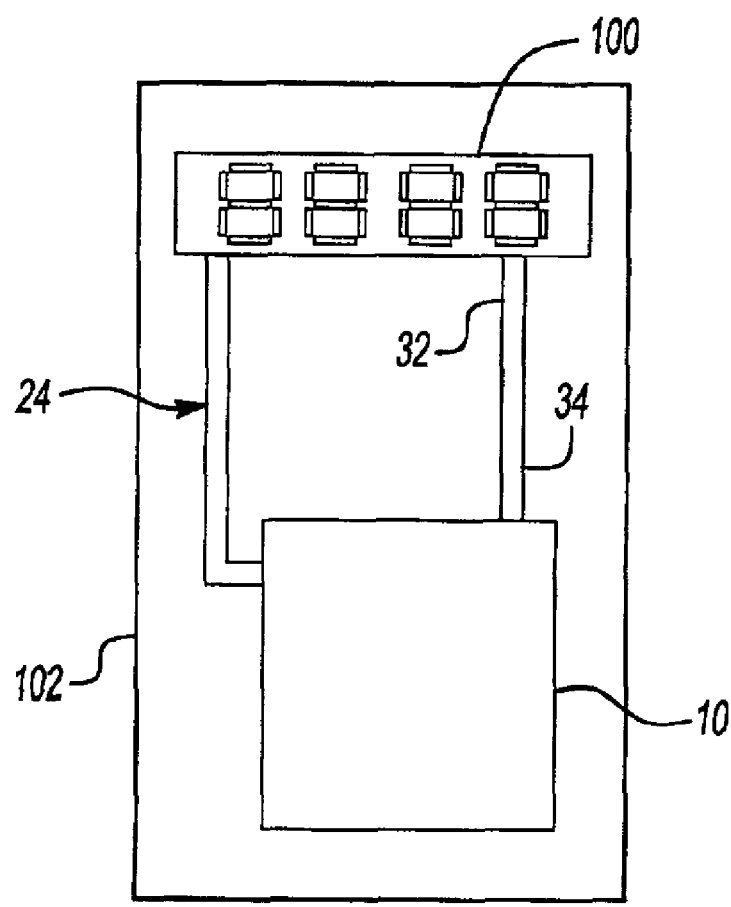
FIG. 2 is a schematic diagram of an LCD device utilizing a voltage power circuit according to the present invention.

FIG. 2 illustrates a LCD device 102 utilizing a power supply circuit 10 according to the present invention. Here, high voltage DC output 32 and low voltage DC output 36 drives the glass of the LCD 100 of the LCD device 102. The high voltage AC output circuit 24 drives the backlight display of LCD 100. LCD device 102 can be any LCD device including, but not limited to, a calculator, computer display screen, vehicle dashboard display or any other LCD device.

Accordingly, the present invention provides multiple DC and AC high voltage outputs with minimal circuitry. It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A voltage power supply circuit comprising:
    an oscillator circuit that provides a voltage output;
    an inductor in series with the voltage output of the oscillator circuit;
    a switch positioned in series with the inductor and the voltage output of the oscillator circuit, the switch being positioned between the inductor and a ground;
    a DC circuit electrically connected to a high potential side of the switch; and
    a battery voltage source supplying voltage to the oscillator circuit;
    wherein the inductor generates an EMF when the switch does not conduct to create a voltage in the DC circuit that exceeds a voltage level of the battery voltage source.

2. The voltage power supply circuit as claimed in claim 1, further comprising a clamping circuit that clamps a voltage output by the DC circuit to a voltage fixed relative to the voltage supplied by the battery voltage source.

3. The voltage power supply circuit as claimed in claim 1, wherein the switch is a FET.

4. The voltage power supply circuit as claimed in claim 3, further comprising a controller IC, the controller IC driving the FET to an open and closed condition.

5. The voltage power supply circuit as claimed in claim 1, wherein the oscillator circuit is a Royer type oscillator.

6. The voltage power supply circuit as claimed in claim 1, further comprising an AC voltage circuit, the oscillator driving the AC voltage circuit.

7. The voltage power supply circuit as claimed in claim 6, wherein the AC voltage circuit drives a cold cathode fluorescent lamp for a liquid crystal display.

8. The voltage power supply circuit as claimed in claim 1, wherein the DC circuit further comprises a high voltage DC output and a low voltage DC output.

9. The voltage power supply circuit, as claimed in claim 8, further comprising:
   a high side liner regulator regulating a voltage of the high voltage DC output; and
   a low side linear regulator regulating a voltage of the low voltage DC output.

10. A voltage power supply circuit as claimed in claim 8, further comprising a high side charge capacitor that stores a voltage generated by the EMF and provides the stored voltage to the high voltage DC output.

11. The voltage power supply circuit as claimed in claim 9, further comprising:
    a coupling capacitor positioned between the low voltage DC output and the low side linear regulator, the coupling capacitor inverting the EMF voltage; and
    a low side charge capacitor storing an inverted voltage from the coupling capacitor, the low side charge capacitor providing the inverted voltage to the low side linear regulator.

12. The voltage power supply circuit as claimed in claim 1, wherein the DC voltage circuit drives a biasing voltage across an LCD glass of a liquid crystal display system.

13. A voltage power supply circuit for a liquid crystal display system comprising:
    a Royer oscillator having a voltage output;
    an inductor in series with the voltage output of the Royer oscillator;
    a FET in series with the inductor and the voltage output, the FET positioned at a low potential side of the inductor;
    a controller IC controlling voltage supplied to a gate of the FET for turning the FET on and off at a predetermined frequency;
    a DC voltage circuit electrically connected to a position between the inductor and the FET;
    an AC voltage circuit driven by the Royer oscillator;
    a cold cathode fluorescent lamp driven by the AC voltage circuit;
    ac LCD glass, a voltage across the LCD glass being selectively driven by the DC circuit;
    a battery voltage source supplying battery voltage to the Royer oscillator; and
    a clamping circuit connected between the DC voltage circuit and the battery voltage source that clamps the DC voltage circuit to a level above a voltage level of the battery voltage source;
    wherein EMF generated by the inductor when the controller IC closes the FET generates a voltage in the DC voltage circuit that exceeds the voltage level of the battery voltage source.

14. An improved voltage power supply for a liquid crystal display device of the type that provides a DC voltage across an LCD glass and an AC voltage to drive a back light display for the liquid crystal display device, the improvement comprising:
    an oscillator circuit that provides a voltage output and drives an AC circuit;
    an inductor in series with the voltage output of the oscillator circuit;
    a switch positioned in series with the inductor and the voltage output of the oscillator circuit, the switch being positioned between the inductor and a ground;
    a DC circuit electrically connected to a high potential side of the switch; and
    a battery voltage source supplying voltage to the oscillator circuit;
    wherein the inductor generates an EMF when the switch does not conduct to create a voltage in the DC circuit that exceeds a voltage level of the battery voltage source.

15. The improvement as claimed in claim 14, further comprising a clamping circuit that clamp the DC circuit to the battery voltage source, the clamping circuit clamping a voltage of the DC circuit to a level above the battery voltage source.

16. The improvement as claimed in claim 14, wherein the switch is a FET.

17. The improvement as claimed in claim 16, further comprising a controller IC, the controller IC driving the FET to an open and closed condition.

18. The improvement as claimed in claim 14, wherein the oscillator circuit is a Royer type oscillator.

19. The improvement as claimed in claim 14, wherein the AC voltage circuit drives a cold cathode fluorescent lamp for the liquid crystal display.

20. An LCD device comprising:
    a voltage power supply circuit for generating a high AC voltage and a high DC voltage to a liquid crystal display of the LCD device, the voltage power supply circuit comprising:
    an oscillator circuit tat provides a voltage output;
    an inductor in series with the voltage output of the oscillator circuit;
    a switch positioned in series with the inductor and the voltage output of the oscillator circuit, the switch being positioned between the inductor and a ground;
    a DC circuit electrically connected to a high potential side of the switch; and
    a battery voltage source supplying voltage to the oscillator circuit;
    wherein the inductor generates an EMF when the switch does not conduct to create a voltage in the DC circuit that exceeds a voltage level of the battery voltage source.

* * * * *